United States Patent
Boyce et al.

(10) Patent No.: US 7,957,469 B2
(45) Date of Patent: Jun. 7, 2011

(54) VIDEO COMFORT NOISE ADDITION TECHNIQUE

(75) Inventors: Jill MacDonald Boyce, Manalapan, NJ (US); Cristina Gomila, Princeton, NJ (US); Jeffrey Allen Cooper, Rocky Hill, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1437 days.

(21) Appl. No.: 10/566,881

(22) PCT Filed: Aug. 4, 2004

(86) PCT No.: PCT/US2004/025366
§ 371 (c)(1),
(2), (4) Date: Feb. 2, 2006

(87) PCT Pub. No.: WO2005/020585
PCT Pub. Date: Mar. 3, 2005

(65) Prior Publication Data
US 2006/0256871 A1    Nov. 16, 2006

Related U.S. Application Data

(60) Provisional application No. 60/496,426, filed on Aug. 20, 2003.

(51) Int. Cl.
*H04N 7/12* (2006.01)

(52) U.S. Cl. .................................. 375/240.25

(58) Field of Classification Search .......... 375/240–241, 375/259, 262, 316, 340, 341, 342, 343; 348/466; 714/6, 746, 751, 761, 762
See application file for complete search history.

(56) References Cited

U.S. PATENT DOCUMENTS

| 5,210,836 A * | 5/1993 | Childers et al. ............... 712/241 |
| 5,450,098 A | 9/1995 | Oz |
| 2002/0061062 A1 * | 5/2002 | O'Brien .................. 375/240.01 |

FOREIGN PATENT DOCUMENTS

| JP | 2005/191994 | 7/2005 |
| JP | 2005/322028 | 11/2005 |
| WO | WO 2004/095829 | 11/2004 |
| WO | WO 2006/027045 | 3/2005 |

OTHER PUBLICATIONS

Search Report dated Dec. 7, 2004.
Christina Gomila, Alexander Kobilansky: "SEI Message for Film Grain Encoding" jvt of ISO IEC MPEG and ITU-T VCEG JVT-H022, May 23, 2003, pp. 1-14, XP002308742 Geneva, Switzerland abstract p. 1, last papagraph-p. 6. line 25; figures 1,2 p. 8, paragraph 4-p. 9, paragraph 2; figure 8.

(Continued)

*Primary Examiner* — Sam K Ahn
(74) *Attorney, Agent, or Firm* — Robert D. Shedd; Robert B. Levy

(57) ABSTRACT

A decoding arrangement for decoding pictures in an incoming video stream includes a noise generator for adding a dither signal containing random noise to the pictures after video decoding, to improve the subjective video quality. The noise generator adds noise to each pixel in an amount correlated to additive noise of pixels in a prior picture, either a previously displayed picture (i.e., a previously decoded picture to which noise has been added), or a previously decoded picture.

32 Claims, 2 Drawing Sheets

OTHER PUBLICATIONS

Schoyer M.K.N. et al.: Block Position Dithering in DCT-Coded Sequences: Signal Processing. Image Communication, Elsevier Science Publishers, Amsterdam, NL, vol. 8, No. 6, Sep. 1996 (pp. 545-549, XP004047116 ISSN: 0923-5965 abstract p. 548, right-hand column, paragraph 2.

Christina Gomila: SEI Message for Film Grain Encoding: Syntax and Results: jvt of ISO IEC MPEG and ITU-T VCEG JVT-1013 Revision 2, Sep. 2, 2003, pp. 1-11, XP002308743 San Diego, CA, USA p. 1, Line 1-p. 5, Last Paragraph.

Greg Conklin, Neelesh Gokhale: "Dithering 5-Tap Filter for Inloop Deblocking" JVT of ISO IEC MPEG and ITU-T VCEG JVT-c056, May 6, 2002 -May 10, 2004 pp. 21-16, XP002308744 fairfax, virginia, usa p. 1, line 2-p. 2, last paragraph.

J.-R. Ohm: "Digitale Bildcodierung, Statistische Und Inhaltsorientierte Bildmodelle (Kapitel 4.1-4.2)" 1995, Springer-Verlag, Berline Heidelbert New York xp002309350 p. 97, Line 1-p. 100, Line 10 p. 103, Last Paragraph-p. 105, Paragraph 1.

Gisle Bjontegaard: "Addition of Comfort Noise as Post Processing" ITU-T SG 16, Video Coding Experts Group, Document 015B15, Sep. 8, 1997, pp. 1-2, XP002319278.

Seung-Ho Park et al: "A Dithering Based Technique for Improving Gray Level Reproduction Capability in Dark Areas on Plasma Display Panels" Journal of Electronic Engineering Society, vol. 39 SP, No. 3; May 2002.

Harry Newton: "Newton's Telecom Dictionary", Miller Freeman Publisher, New York, NY, copyright 1999, 15$^{th}$ Updated Edition, p. 62, ISBN 1-57820-031-8.

* cited by examiner

VIDEO COMFORT NOISE ADDITION TECHNIQUE

This application claims the benefit, under 35 U.S.C. §365 of International Application PCT/US2004/025366, filed Aug. 4, 2004, which was published in accordance with PCT Article 21(2) on Mar. 3, 2005 in English and which claims the benefit of U.S. provisional patent application No. 60/496,426, filed Aug. 20, 2003.

TECHNICAL FIELD

This invention relates to a technique for reducing artifacts in connection with decoding of a coded video stream.

BACKGROUND ART

The decoding of a video stream compressed at low bit rate tends to cause visible artifacts noticeable to a viewer. Blockiness and structured noise patterns are common artifacts that arise when using block-based compression techniques. The human visual system has a greater sensitivity to certain types of artifacts, and thus, such artifacts appear more noticeable and objectionable than others. The addition of random noise to the decoded stream can reduce the noticeability of such compression artifacts, but large frame-to-frame differences created by adding random noise can itself produce artifacts that appear noticeable and objectionable.

The addition of a dither signal can reduce human sensitivity to image artifacts, for example to hide contouring and blocking artifacts. One prior art technique has proposed adding a random noise dither that is based on film grain to an image to disguise block effects. The rationale for adding such random noise is that random error is more forgiving than the structure, or correlated error. Other prior art techniques have proposed adding a dither signal to a video stream to hide compression artifacts. Once past technique has proposed adding a random noise dither in the video encoding and decoding process in the in loop deblocking filter for the ITU/ISO H. 264 video coding standard, commonly known as the JVT coding standard. The amount of dither to be added depends on the position of a pixel with respect to a block edge. Another prior technique has proposed adding that random noise subsequent to video decoding (i.e., adding noise as a "post process"), for use as comfort noise. The amount of noise added depends on the quantization parameter and on the amount of noise added to spatially neighboring pixels. The term "comfort noise" comes from the use of noise in audio compression to indicate noise pattern generated at the receiver end to avoid total silence that is uncomfortable to a listener.

Past techniques for reducing artifacts by adding noise typically reduce spatial artifacts at the risk of creating temporal abnormalities, i.e., large frame-to-frame differences. Thus, there exists a need for a technique for reducing artifacts during decoding of a coded video stream that overcomes the aforementioned disadvantages.

BRIEF SUMMARY OF THE INVENTION

Briefly, in accordance with a preferred embodiment of the present principles, there is provided a method for reducing artifacts in a video stream during decoding. The method commences by decoding the video stream. Following decoding, noise is added to the video stream by adding noise to each pixel in an amount correlated to the additive noise of pixels in a prior picture. Thus, in accordance with the present principles, temporal noise correlation aids in determining the additive noise to reduce large frame-to-frame differences, a disadvantage of prior noise additive techniques.

In accordance with another embodiment of the present principles, the prior picture from which the additive noise is derived comprises a displayed picture (i.e., a previously decoded picture to which noise has been added). In yet another embodiment, the prior picture comprises a previously decoded picture.

DETAILED DESCRIPTION

Figure 1:
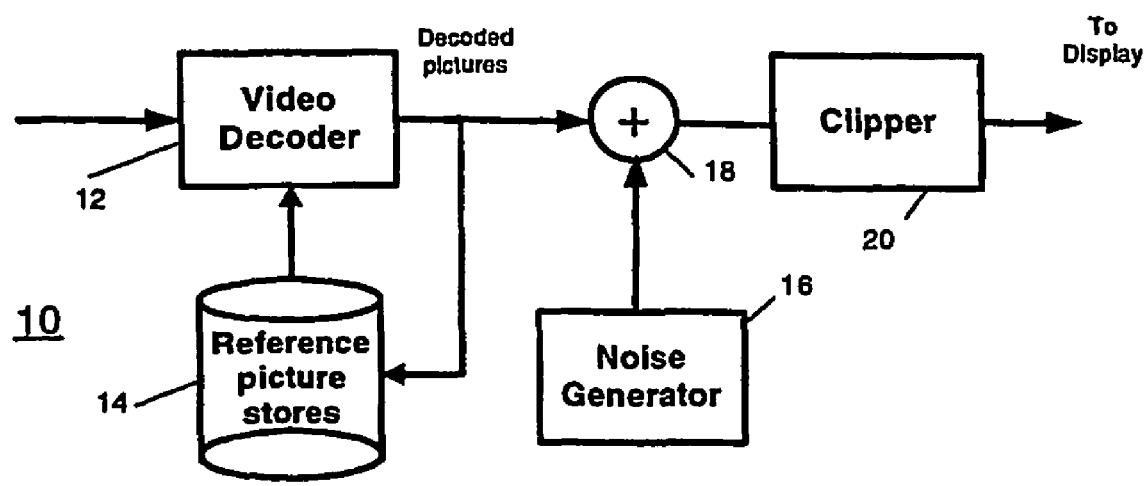
FIG. 1 depicts a block schematic diagram of a video decoder in accordance with a first embodiment of the present principles, for reducing artifacts in connection with decoding a coded video stream.

In accordance with the present principles, adding a random-noise containing dither signal, to already decoded signal, in an amount correlated to the additive noise of pixels in a prior picture, serves to improve the subjective video quality. FIG. 1 shows a block schematic diagram of a first decoder arrangement 10 for adding noise after decoding. The decoder arrangement 10 includes a decoder 12 for decoding an incoming coded video stream. The design of decoder 12 depends on the compression format employed to code the incoming video stream. In a preferred embodiment, the incoming video stream undergoes compression using the well-known ITU/ISO H. 264 standard. Under such circumstances, the decoder 12 takes the form of a H.264 decoder known in the art. A reference picture store 14 stores pictures decoded by the decoder 12 for use by the decoder in decoding future pictures.

A summing block 18 sums each decoded picture from the decoder 12 with noise from a noise generator 16. A clipper 20 then clips the resultant signal output by the summing block 18 to yield a decoded picture for display which exhibits reduced artifacts. Note that noise addition occurs after storage of decoded pictures in the reference picture store 14 since the reference pictures must remain unchanged in order to properly decode the subsequent incoming pictures.

The magnitude of the noise signal from the noise generator 16 added to each decoded picture typically depends on several different factors. To better understand the factors associated with noise addition, let the term N(k, x, y) represent the added pixel noise signal, P(k, x, y) represent the decoded pixel, and D(k, x, y) represent the displayed pixel (x, y) of the $k^{th}$ picture in the video sequence, respectively. The $k^{th}$ pixel of the displayed picture becomes the sum of the decoded pixel plus the noise signal, as given by the relationship $$D(k, x, y) = \text{Clip}(0, 255, P(k, x, y) + N(k, x, y)) \quad \text{(Equation 1)}$$

The visual impact of adding a noise signal to the video sequence, rather than just to a single image, becomes a consideration in the determination of the magnitude of the noise signal. In accordance with the present principles, the noise generator 16 correlates the magnitude of additive noise signal for at least one pixel in a picture to the value of the additive noise signal of at least one pixel in at least one previously displayed picture, i.e., a decoded picture to which noise has been added. In an alternative embodiment of the current invention, the temporal correlation is based on the previously decoded picture (which contains no noise), rather than the previously displayed picture that contains noise. While noise is typically added to each pixel, comfort noise could be added to some pixels, not necessarily every pixel.

In first embodiment, noise addition using temporal correlation make use of a correlation factor α, $0 \leq \alpha \leq 1$, yielding the following relationship for added noise:

$$N(k, x, y) = \alpha N(k-1, x, y) + (1-\alpha) R(k, x, y) \quad \text{(Equation 2.)}$$

where R(k, x, y) is a random number generated using any type of random number distribution, for example a Gaussian or Laplacian distribution. Random number generation can occur by means of a lookup table. The random number R(k, x, y) can also include spatial correlation, such as that used in film grain noise generation.

The term α in Equation 2 has a value less than unity and to avoid division by α, Equation 2 can be simplified as follows:

$$N(k, x, y) = (a*N(k-1, x, y) + (2^b - a) R(k, x, y) + 2^{b-1}) >> b \quad \text{(Equation 3)}$$

with scaling variable b, chosen based on the desired precision of the division approximation, and the $a = \text{round}(\alpha * 2^b)$.

Figure 2:
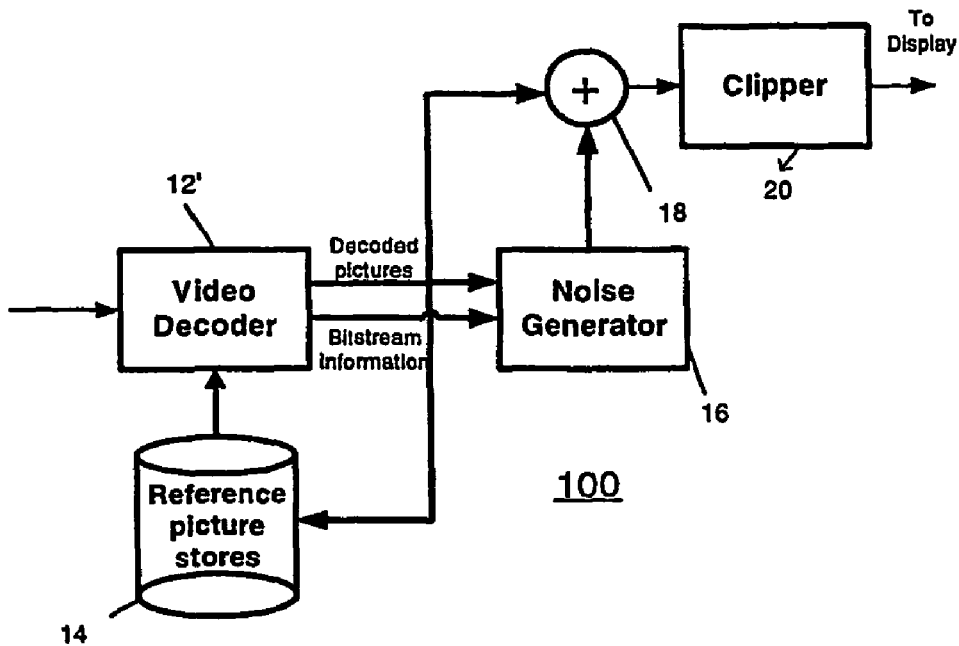
FIG. 2 depicts a block schematic diagram of a video decoder in accordance with a second embodiment of the present principles, for reducing artifacts in connection with decoding a coded video stream.
Figure 3:
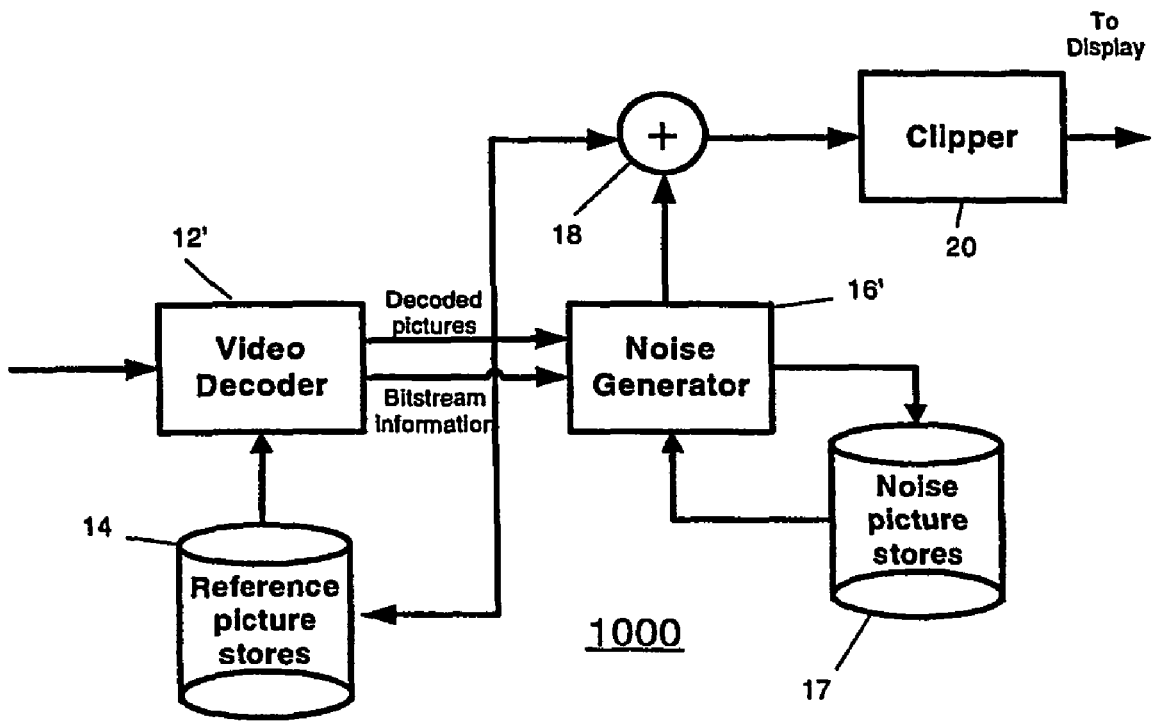
FIG. 3 depicts a block schematic diagram of a video decoder in accordance with a third embodiment of the present principles, for reducing artifacts in connection with decoding a coded video stream.

FIG. 2 depicts a block schematic diagram of a decoder arrangement 100 for adding temporally correlated noise to a video picture after decoding in accordance with a second illustrative embodiment of the present invention. The decoder arrangement 100 of FIG. 2 contains elements in common with the decoder arrangement 10 of FIG. 1. Therefore, like numbers appear in FIG. 3 to identify like elements. The decoder arrangement 100 of FIG. 2 includes a video decoder 12' which supplies a noise generator 16' with both a decoded picture, as well bit stream information contained in the decoded picture. The bit stream information output by the decoder 12' can include a quantization parameter input to the noise generator. The severity of compression artifacts is correlated to the quantization parameter, with more severe compression artifacts occurring when high quantization parameter values are used. The strength of the added comfort noise can be increased as the quantization parameter value increases. FIG. 3 depicts a block schematic diagram of a decoder arrangement 1000 for adding temporally correlated noise to a video picture after decoding in accordance with a third illustrative embodiment of the present invention that is compatible with Equations 1 and 2. The decoder arrangement 1000 of FIG. 3 contains elements in common with the decoder arrangement 100 of FIG. 2. Therefore, like numbers appear in FIG. 3 to identify like elements. Like the decoder arrangement 100 of FIG. 2, the decoder arrangement 1000 of FIG. 3 includes a video decoder 12' which supplies a noise generator 16' with both a decoded picture, as well bit stream information contained in the decoded picture. The decoder arrangement 1000 of FIG. 3 does differ from the decoder arrangement 100 of FIG. 2 in one respect. Unlike the decoder arrangement 100 of FIG. 2, the decoder arrangement 1000 of FIG. 3 includes a noise picture store 17 which stores the noise signal N(k, x, y) for the $k^{th}$ picture for subsequent use by the noise generator 16'. The decoder arrangement 1000 of FIG. 3 requires more memory bandwidth than the decoder arrangements 10 and 100 of FIGS. 1 and 2, respectively. For each displayed picture, the decoder arrangement 1000 of FIG. 3 must access the previously displayed picture's noise signal and must also store the current picture's noise signal.

Implementing Equation 3 in a decoder arrangement, such as the decoder arrangement 1000 of FIG. 3 will yields an instantiation of a temporal Infinite Impulse Response (IIR) filter. Such an IIR filter can be generalized by using one or more filter taps. Such IIR filters can also generally be approximated using higher order FIR filters, using as many taps, t, as desired.

$$N(k, x, y) = \sum_{i=0}^{t-1} \alpha^{i+1} N(k-i, x, y) + \alpha^i (1-\alpha) R(k-i, x, y) \quad \text{(Equation 4)}$$

An FIR filter approach can be implemented using the decoder arrangement 100 of FIG. 2. Only the previous random numbers R, rather than the previous noise, N, is used in an FIR filter approach, so memory bandwidth is reduced.

The foregoing describes a technique for reducing artifacts in connection with decoding of a coded video stream by adding noise

What is claimed is:

1. A method for reducing artifacts in a video stream, comprising the steps of:
    decoding the video stream; and
    adding noise to at least one pixel in a picture in the video stream following the decoding of the video stream in an amount correlated to additive noise of pixels in at least one prior picture.

2. The method according to claim 1 wherein the at least one prior picture comprises a previously displayed picture.

3. The method according to claim 1 where the at least one prior picture comprises a previously decoded picture.

4. The method according to claim 1 wherein the amount of noise is correlated in accordance with a correlation factor α having a value such that $0 \leq \alpha \leq 1$.

5. The method according to claim 1 wherein the amount of noise is correlated using an instantiation of a Finite Impulse Response (FIR) filter.

6. The method according to claim 1 wherein the amount of noise is correlated using an approximation of an Infinite Impulse Response (IIR) filter.

7. A method for reducing artifacts in a video stream, comprising the steps of:
    decoding a video stream in a video decoder; and
    adding noise to at least one pixel in a picture in the video stream following the decoding of the video stream in an amount correlated to additive noise of pixels in at least one prior picture, wherein the noise amount is determined by extracting bit stream information from the video stream; and
    determining strength of the added noise in accordance with the bit stream information.

8. The method according to claim 7 wherein the bit stream information comprises a quantization parameter.

9. The method according to claim 7 wherein the added noise is Gaussian noise.

10. The method according to claim 7 wherein the added noise is Laplacian noise.

11. A method for reducing artifacts in a video stream, comprising the steps of:
    decoding the video stream in a video decoder; and
    adding noise to at least one pixel in a picture in the video stream following the decoding of the video stream in an amount correlated to additive noise of at least one other pixel in a prior picture.

12. A decoder arrangement for decoding a coded video stream to yield reduced artifacts, comprising:
    a video decoder for decoding an incoming coded video stream to yield decoded pictures;

a reference picture store for storing at least one previously decoded picture decoded by the decoder for use by the decoder in decoding future pictures, a noise generator noise for generating noise for addition to at least one pixel in a decoded picture in an amount correlated to additive noise of at least one pixel in at least one prior picture;

a summing block for summing the noise generated by the noise generator with a decoded picture from the decoder; and a clipper for clipping the summed noise and decoded picture.

13. The decoder arrangement according to claim 12 wherein the noise generator implements an instantiation of a Finite Impulse Response filter.

14. The decoder arrangement according to claim 12 wherein the noise generator implements an approximation of an Infinite Impulse Response filter.

15. The decoder arrangement according to claim 12 wherein the noise generator generates noise in accordance with decoded pictures and bit stream information supplied from the decoder.

16. The decoder arrangement according to claim 15 wherein the bit stream information comprises a quantization parameter.

17. The decoder arrangement according to claim 12 further including a noise picture store for storing the noise information for subsequent use by the noise generator.

18. The decoder arrangement method according to claim 12 wherein the noise generator adds Gaussian noise.

19. The decoder arrangement method according to claim 12 wherein the noise generator adds Laplacian noise.

20. A decoder arrangement for decoding a coded video stream to yield reduced artifacts, comprising:

a video decoder for decoding an incoming coded video stream to yield decoded pictures;

a reference picture store for at least one storing at least one previously decoded picture decoded by the decoder for use by the decoder in decoding future pictures, a noise generator noise for generating noise in accordance with decoded pictures and bit stream information from the decoder for addition to at least one pixel in decoded in an amount correlated to additive noise of at least one pixel in a prior picture;

a summing block for summing the noise generated by the noise generator with a decoded picture from the decoder; and a clipper for clipping the summed noise and decoded picture.

21. The decoder arrangement according to claim 20 wherein the bit stream information comprises a quantization parameter.

22. The decoder arrangement according to claim 20 wherein the noise generator implements an instantiation of a Finite Impulse Response filter.

23. The decoder arrangement according to claim 20 wherein the noise generator implements an approximation of an Infinite Impulse Response filter.

24. The decoder arrangement according to claim 20 further including a noise picture store for storing the noise information for subsequent use by the noise generator.

25. The decoder arrangement method according to claim 20 wherein the noise generator adds Gaussian noise.

26. The decoder arrangement method according to claim 20 wherein the noise generator adds Laplacian noise.

27. A decoder arrangement for decoding a coded video stream to yield reduced artifacts, comprising:

a video decoder for decoding an incoming coded video stream to yield decoded pictures;

a reference picture store for at least one storing picture previously decoded by the decoder for use by the decoder in decoding future pictures, a noise generator noise for generating noise for addition to at least one pixel in a decoded picture in an amount correlated to additive noise of pixels in a prior picture;

a noise picture store for storing the noise information for subsequent use by the noise generator;

a summing block for summing the noise generated by the noise generator with a decoded picture from the decoder;

a clipper for clipping the summed noise and decoded picture.

28. The decoder arrangement according to claim 27 wherein the noise generator implements an instantiation of a Finite Impulse Response filter.

29. The decoder arrangement according to claim 27 wherein the noise generator implements an approximation of an Infinite Impulse Response filter.

30. The decoder arrangement method according to claim 27 wherein the noise generator adds Gaussian noise.

31. The decoder arrangement method according to claim 27 wherein the noise generator adds Laplacian noise.

32. A decoder arrangement for decoding a coded video stream to yield reduced artifacts, comprising:

a video decoder for decoding an incoming coded video stream to yield decoded pictures;

a reference picture store for storing at least one previously decoded picture decoded by the decoder for use by the decoder in decoding future pictures, a noise generator noise for generating noise for addition to at least one pixel in a decoded picture in an amount correlated to additive noise of at least one pixel in the at least one previously decoded picture;

a summing block for summing the noise generated by the noise generator with a decoded picture from the decoder; and a clipper for clipping the summed noise and decoded picture.

* * * * *